United States Patent [19]
May

[11] Patent Number: 5,600,873
[45] Date of Patent: Feb. 11, 1997

[54] FLOATING TETHER CORDS

[76] Inventor: David G. May, 28 Windsor Dr., Little Rock, Ark. 72209

[21] Appl. No.: 103,185

[22] Filed: Aug. 6, 1993

Related U.S. Application Data

[63] Continuation-in-part of Ser. No. 694,888, May 2, 1991, Pat. No. 5,235,355, which is a continuation-in-part of Ser. No. 432,619, Nov. 6, 1989, Pat. No. 5,015,085.

[51] Int. Cl.$^6$ .................................................. A45F 5/00
[52] U.S. Cl. ................................ 24/3.2; 24/3.3; 24/3.6; 24/3.13; 200/330; 441/6; 441/133
[58] Field of Search ................................ 24/3 R, 3 A, 3 B, 24/3 C, 3 M, 3 K, 300, 301, 3.2, 3.3, 3.13; 224/219, 221, 222, 254, 267, 269; 441/75, 1, 6, 133, 136; 351/156, 157; 200/330, 331

[56] References Cited

U.S. PATENT DOCUMENTS

| | | | |
|---|---|---|---|
| 1,566,192 | 12/1925 | Forrest | 224/254 |
| 1,879,991 | 9/1932 | Pratt . | |
| 2,845,670 | 8/1958 | Brown et al. | 24/16 R |
| 2,947,456 | 8/1960 | Seron | 24/3 BX |
| 3,797,075 | 3/1974 | Seron | 224/202 X |
| 3,874,776 | 4/1975 | Seron | 351/156 X |
| 3,908,875 | 9/1975 | Wilson et al. | 224/254 |
| 3,927,808 | 12/1975 | Steen | 224/267 |
| 4,133,604 | 7/1979 | Fuller | 351/156 X |
| 4,479,785 | 10/1985 | Tugwood et al. | 441/75 |
| 4,830,244 | 5/1989 | Brannon | 224/269 X |
| 5,015,085 | 5/1991 | May . | |
| 5,019,000 | 5/1991 | Stephens | 441/6 |
| 5,074,656 | 12/1991 | Parrish | 351/156 |
| 5,235,355 | 8/1993 | May . | |
| 5,324,220 | 6/1994 | Stewart | 441/75 |

*Primary Examiner*—James R. Brittain
*Attorney, Agent, or Firm*—Stephen D. Carver; Trent C. Keisling

[57] ABSTRACT

Buoyant tether cords that remove ignition keys from personal watercraft to safely disable the motor in the event a rider falls off. When dropped in the water the cords float so that the ignition key is not lost. The cords float horizontally to maximize visibility. The cord has an elongated embodiment and a looped embodiment. Both have a brightly colored floating body that is attached to a stretchable, coil section. The coil enables the cord to elongate or contract. Both cords have one end to be coupled to the watercraft key, and an opposite end to be coupled to the rider. The floating body comprises an elongated, tubular foam core having an interior passageway. The core is preferably made from lightweight, flexible low-density closed cell foam. The core is preferably coaxially covered by a resilient, tubular knitted fabric sheath that strengthens and colors it. Each coil comprises plastic-coated string. Ends of the coil coaxially penetrate the entire interior of the core, reinforcing the body and strengthening the cord.

4 Claims, 2 Drawing Sheets

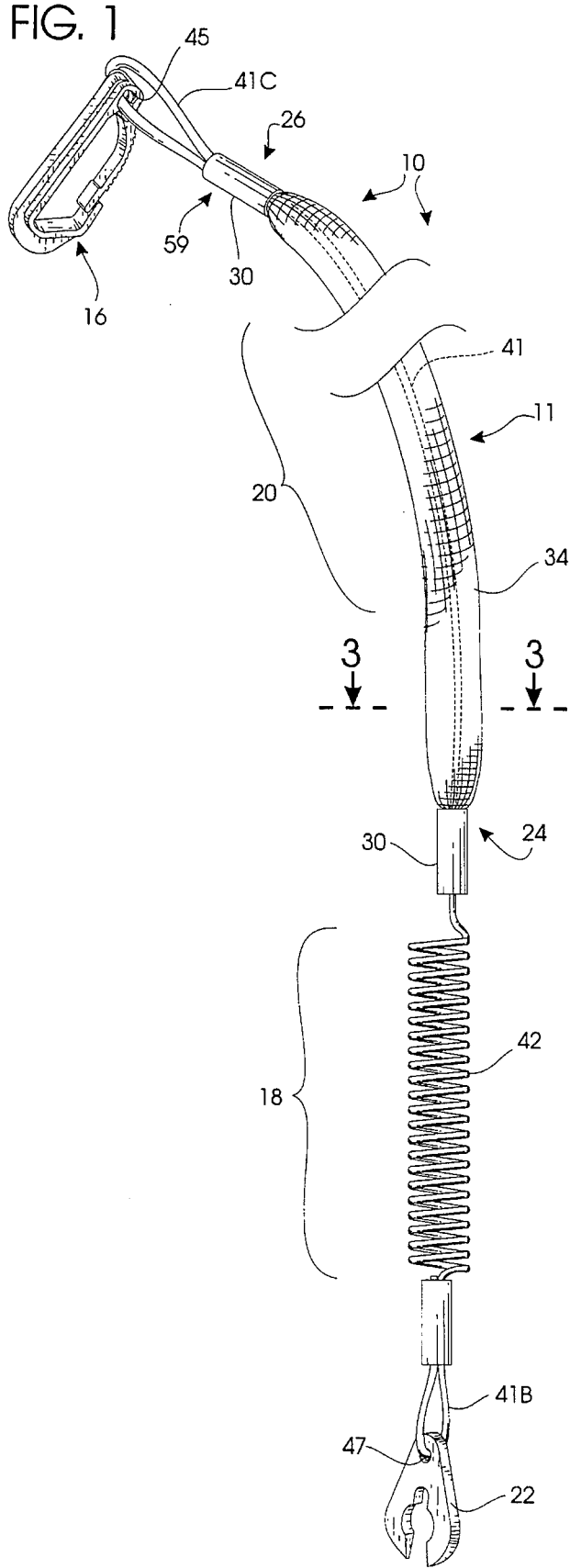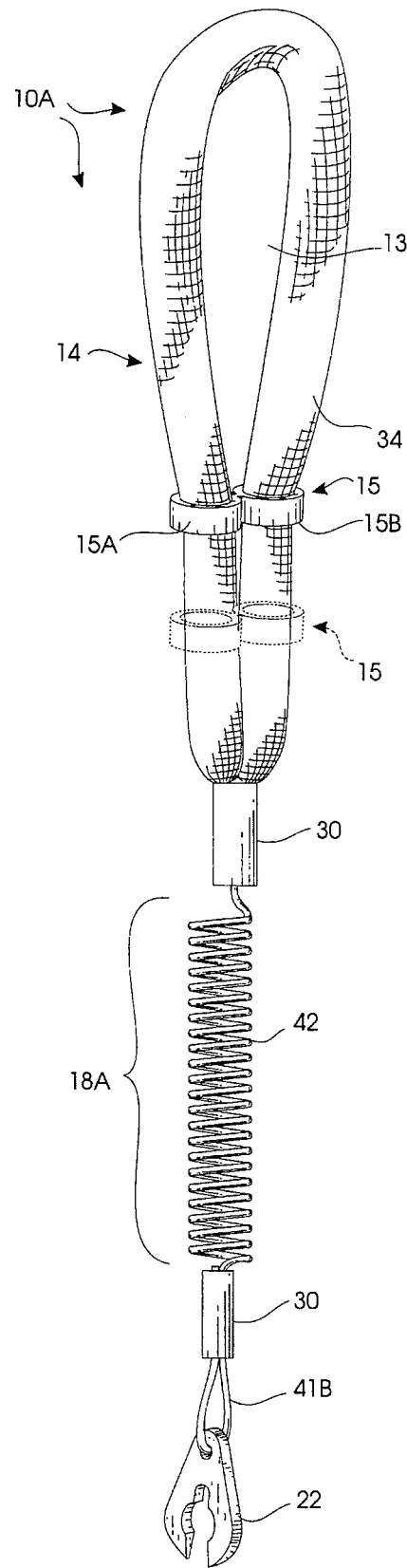

FLOATING TETHER CORDS

CROSS-REFERENCE TO RELATED APPLICATION

This Application is a Continuation-in-Part of my patent application Ser. No. 07/694,888; Filing Date: May 2, 1991, now U.S. Pat. No. 5,235,355; Examiner: R. Bovernick; Group Art Unit: 2507; Entitled: BUOYANT EYEGLASS RETAINERS; that is a Continuation-in-Part of my now issued patent application Ser. No. 07/432,619, filed Nov. 6, 1989, now U.S. Pat. No. 5,015,085, issued May 14, 1991; entitled: Floatable Retainer for Eyeglasses.

BACKGROUND OF THE INVENTION

1. Field of Invention

This invention relates broadly to ignition safety devices for boats or personal watercraft. More particularly, the present invention relates to tether cords for controlling ignition switches on motor-powered watercraft such as the Kawasaki® JET-SKI™, the Bombardier® SEA DOO™ and the Yamaha® WAVE RUNNER™.

2. Description of the Prior Art

Personal items such as sunglasses, keys, and other beach accessories are easily misplaced, and may be quickly lost if dropped into the water. Vigorous outdoor beach activities can often lead to lost or misplaced items. Boat riders often have their possessions blown into the water by the wind. Conventional beach wear clothing seldom provides adequate pockets or pouches for conveniently storing personal articles such as sunglasses. I previously developed a unique floating cord construction for beach and water use that protects eyeglasses and other personal items, and prevents them from sinking into the water.

A prior art headband is disclosed in U.S. Pat. No. 4,133,604 issued Jan. 9, 1979. It comprises a flexible band that terminates in a pair of tubular ends. The ends slidably engage the temple pieces, so that the eyeglasses are securely retained in position during sports activities and the like. U.S. Pat. No. 4,541,696 issued to Winger/Friedopher on Sep. 17, 1985 teaches a tubular, knit cord for retaining eyeglasses about the neck. A similar device is illustrated in U.S. Pat. No. 2,481,946 issued to Pendleton on Sep. 13, 1949.

U.S. Pat. No. 3,874,776 issued to Seron on Apr. 1, 1975 teaches a flexible eyeglass retainer that is adjustably coupled to the eyeglass templates by a flexible loop. Bloom, U.S. Pat. No. 2,660,092 issued Nov. 24, 1953 suggests the desirability of providing a flexible, adjustable-width, cushioned head-strap for retaining eyeglasses in position. The strap terminates at both ends in a flexible loop, that is captured by a slidable pin or hook associated with the glasses frame. McCulley patent 4,848,861 teaches an earpiece cushion for eyeglasses.

Structures for floating eyeglasses are also known in the prior art. For example, U.S. Pat. No. 3,711,190 issued to Blair on Jan. 16, 1973 comprises a blow-molded air cell that is threaded by resilient loops to the temples of the eyeglasses. Related devices are illustrated in U.S. Pat. Nos. 3,038,375 issued to Gansz on Jun. 12, 1962 and 3,390,938 issued to Gansz on Jul. 2, 1968. Floatable spectacles are taught by Goodman in U.S. Pat. No. 3,740,124 issued Jun. 19, 1973 and by Wilson in U.S. Pat. No. 3,517,989 issued Jun. 30, 1970.

U.S. Pat. No. 4,133,604 issued Jan. 9, 1979 discloses a flexible band that terminates in a pair of tubular ends. The ends slidably engage the temple pieces, so that the eyeglasses are securely retained in position during sports activities and the like. U.S. Pat. No. 4,541,696 issued to Winger/Friedopher on Sep. 17, 1985 teaches a tubular, knit cord for retaining eyeglasses about the neck. A similar device is illustrated in U.S. Pat. No. 2,481,946 issued to Pendleton on Sep. 13, 1949.

U.S. Pat. No. 3,874,776 issued to Seron on Apr. 1, 1975 teaches a flexible eyeglass retainer that is adjustably coupled to the eyeglass templates by a flexible loop. Bloom, U.S. Pat. No. 2,660,092 issued Nov. 24, 1953 suggests the desirability of providing a flexible, adjustable-width, cushioned head-strap for retaining eyeglasses in position. The strap terminates at both ends in a flexible loop, Shat is captured by a slidable pin or hook associated with the glasses frame. McCulley patent 4,848,861 teaches an earpiece cushion for eyeglasses.

Recently "personal watercraft" or "PWC's" such as the aforementioned JET-SKI™, SEA DOO™, and WAVE RUNNER™ have become very popular. Usually the ignition is controlled by a removable plastic key system that is withdrawn to shut down the motor. With the SEA DOO™, for example, a push button ignition switch must be maintained in a closed (i.e., pushed in) position for the ignition to work. A removable "key" in the form of a button that snap fits to the push button ignition must be in place for the ignition to work; when removed by a prior art tether cord, the ignition is shut off. Thus for safety, the key is linked to the rider so that the motor stops if the rider falls off.

Known motor safety tether cords are difficult to see, and they are often misplaced. Since they usually do not float they will sink when dropped into the water, carrying the jet ski key with them. Since the jet ski key may be conventionally joined with heavier conventional key chains, the key may be lost when the chain drops in the water.

A floating tether cord sold under the trademark SEA DOO™ is known. It has a coiled, stretchable string portion and a smaller length, floating portion made of foam. When floating in the water, the coiled portion sinks and the small floating portion rises to the top, much like a fisherman's bobber. Much of the floating portion is beneath the water. It is difficult to see because only minimal body parts are visible above the water.

There thus exists a need for a highly visible and attractive tether cord safety system that protects the jet ski or boat rider, that is easy to use, highly visible, and buoyant. An ideal tether cord device must be highly visible when floating; if the device could float "horizontally" rather than "vertically" it's exposed surface area is maximized to an observer. Also, to prevent tangles, it is desired to have the coiled portion spaced apart from the user by an elongated non-coiled portion.

SUMMARY OF THE INVENTION

I have designed a floating tether cord that can remove the ignition key from jet ski's and other motor-powered water craft to disable them. The tether cords enhance motor safety, by providing an auxiliary motor shut-off. When, for example, the rider or boater falls off, the motor will be disabled when the key is extracted.

The cord has two primary embodiments. One is essentially elongated, and the other is looped. Both have a brightly colored, elongated floating body that is clamped to a retractable coil. The unique body makes the cord float horizontally when dropped into the water. The coil enables the cord to elongate or retract. By using either tether cord built according to the invention, a boater or jet ski rider is assured that the motor will shut off if he or she falls off.

Both cords have one end to be coupled to the key, and an opposite end to be coupled to the user. Each preferably comprises a stretchable, coiled portion that is clamped to a floating body portion. The body preferably comprises an elongated, tubular, buoyant core. The core has an inner, coaxially centered passageway. The core is preferably made from lightweight, flexible low-density closed cell foam, such as neoprene or polyethylene foam. The core is preferably coaxially covered by a resilient, tubular fabric sheath that strengthens and colors it. This protective sheath is best made from knitted fabric, preferably polyester.

Each retractable coil is plastic-coated. Preferably ends of the coil coaxially penetrate the entire interior length of the body, reinforcing the body and strengthening the cord. Ends of the structure are clamped together, and a plastic tube is placed over the crimped connections to protect and cover the junction.

Thus the most basic object of my invention is to provide a safety tether cord for personal watercraft ignitions.

A related object is to provide a floating tether cord for personal watercraft ignition kill switches.

Another important object is to provide a tether cord that is highly visible when floating in the water. It is an important feature of my invention that the cord rides horizontally upon the water to present the maximum surface area to an observer.

Another basic object is to provide an attractive, decorative tether cord that may be manufactured in a variety of popular beach colors and color schemes.

A further object of my invention is to provide a rugged, floating tether cord that is ideal for outdoor use by boaters and swimmers.

A related object is to provide an ignition disabling tether cord that is ideal for a variety of water or beach applications.

A fundamental object is to provide a system that keeps ignition keys afloat in the event they are dropped in the water.

Yet another object of the present invention is to provide a lightweight and comfortable tether cord that can be conveniently worn upon the body.

A related object is to provide a high-visibility, buoyant tether cord that is suitable for use by a variety of water sportsmen.

A further object is to provide a tether cord body arrangement that enables a large variety of color schemes and eases the screen printing of logo's and the like upon the cord. It is a feature of the invention that the body has an outer coaxial fabric sheath that facilitates the aforementioned attributes.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 1 is a perspective view of a first embodiment of my floating tether cord;

FIG. 2 is a perspective view of a looped embodiment of my floating tether cord, with dashed lines showing the handle loop in a moved position;

DETAILED DESCRIPTION OF THE DRAWINGS

Figure 3:
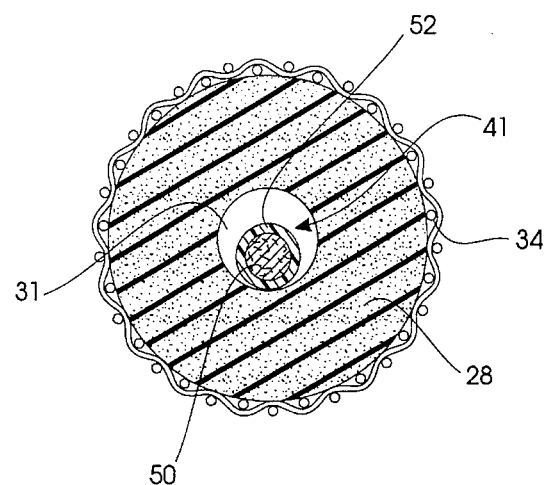
FIG. 3 is an enlarged sectional view taken generally along line 3—3 of FIG. 1.

With initial reference to FIGS. 1 and 2 of the accompanying drawings, my new floating tether cord invention has two primary embodiments. Tether cord 10 (FIG. 1) comprises an elongated floating body portion 11 that is essentially straight. Embodiment 10A (FIG. 2) has a "looped" body portion 14 the center 13 of which may be directly grasped by a user. Cord 10 terminates in a conventional clasp 16 that can be coupled, for example, to a user's belt loop. The other end of the tether cord is coupled to a key 22 that, once removed from the water craft ignition, disables the boat or jet ski. Key 22 illustrated is made by Kawasaki® for their JET-SKI™ product. The keys for the Bombardier® SEA DOO™ and the Yamaha® WAVE RUNNER™ are shaped differently than key 22, but they can be mounted to the instant tether cord similarly. By using the tether cord 10 or 10A a rider is assured that the jet ski, for example, will shut off if he or she is separated from the craft.

Cord 10 comprises a stretchable, coiled portion 18 that is clamped to a floating body portion 20. Cord 10A similarly includes a stretchable coiled portion 18A that is clamped to both of the opposing ends of body 14. Coil portions 18, 18A are coupled to a key 22 that can be removed from watercraft ignitions to disable them. The coiled portion can contract or elongate depending upon axial stress experienced by the cord. Cord 10 may alternatively have its coil end 18 coupled to clasp 16, with body 20 coupled to key 22. With cord 10A it is preferable that the body be grasped by the user, or worn about a limb or wrist. In other words, one can fasten the cord 10A to their arm by inserting one's hand through loop orifice 13. The cord body 14 is strengthened by a movable plastic adjustment coupling 15 that is shaped like a "FIG. 8." Each half 15A and 15B receives a portion of the body, and as indicated in dashed lines in FIG. 2, the position of the coupling 15 can be varied to change the size of orifice 13. Thus the cord 10A may be adjusted for comfort.

Body 20 comprises a pair of opposing, spaced apart ends generally designated by the reference numerals 24, 26. As seen in FIG. 1 and 2, the body of each cord is elongated, and it is longer than the length of the retracted coiled portion to space apart the coil form the user to prevent tangles. This construction further insures that the body will float horizontally on the water surface to maximize visibility.

As will be described in more detail later, each end 24, 26 is rigidly clamped and covered with a protective tubular, plastic cover 30. With additional reference to FIG. 3, each body 20, 14 comprises a unitary, elongated, buoyant core 28. The core is generally tubular, having an inner passageway 31. Each core preferably comprises a lightweight, flexible low-density closed cell foam, such as neoprene or polyethylene foam. However, it will be appreciated that other lightweight, buoyant material that can be molded into the unitary, elongated tubular shape required.

Core 28 is preferably coaxially covered by a resilient, tubular sheath 34. Outer protective sheath 34 preferably comprises a unitary, seamless tube of knitted fabric, such as polyester. Sheath 34 slip-fits over the core, and it resiliently conforms to the core shape while strengthening it. In addition to providing a gripping surface, it colors the body. Preferably sheath 34 comprises a highly visible, brightly colored fabric that may be easily spotted against normal backgrounds, such as water, sand, or furniture. The fabric covering enables the cord to be easily colored as desired. Further, the cord covering facilitates screen printing of desired logo's or the like.

With their preferred bright "neon" colors, each tether cord 10, 10A immediately attracts attention and is easily seen. Thus the cords are not easily misplaced. If they are dropped into the water, the brightly colored outer sheath enables the cord to be easily spotted on the water's surface, readily facilitating retrieval. The elongated body forces the cord to float horizontally rather than vertically.

Coil portions 18 and 18A are virtually identical. Each comprises a length of plastic-coated string 41 (FIG. 3) suitable for winding into coil spring form. In the best mode the coil portion 42 is approximately three to four inches long. The overall length of the tether cord is eighteen to twenty-five inches long. Preferably ends of the string 41 of the coil portion 18 is transmitted axially all the way through the body. Thus string 41 is generally coaxially disposed within the hollow body core passageway 31 (FIG. 3) for reinforcement purposes. In FIG. 1 looped terminal portions of the coiled portion are designated by the reference numerals 41B and 41C. Terminal portion 41C is looped through a mounting orifice 45 in clasp 16; terminal portion 41B is looped through orifice 47 in key 22 to captivate it. As best seen in FIG. 3, string 41 preferably comprises a central fabric core 50 covered by a tubular, plastic sheath 52. Sheath 52 is waterproofs the string 41, adds flotation, and brightly colors it.

Figure 4:
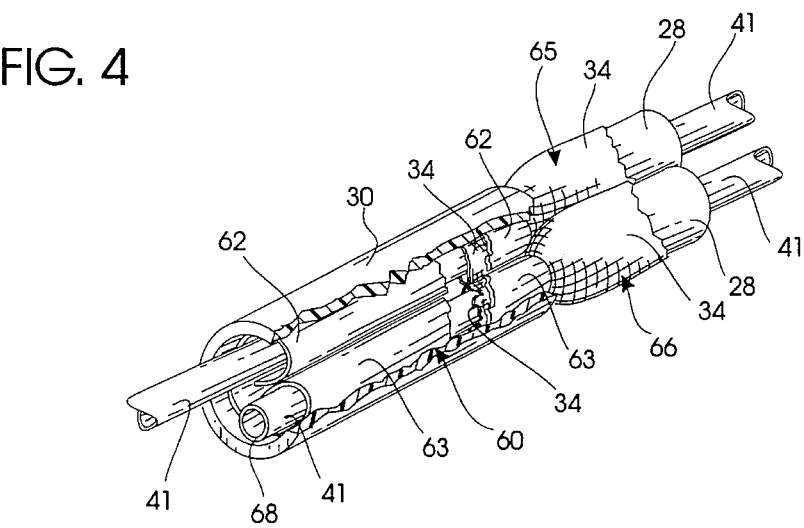
FIG. 4 is a fragmentary perspective view of the floating tether cord of FIG. 2, showing how ends of the looped body portion are coupled to the coiled portion; and, FIG. 5 is a fragmentary perspective view of the floating tether cord of FIG. 1.
Figure 5:
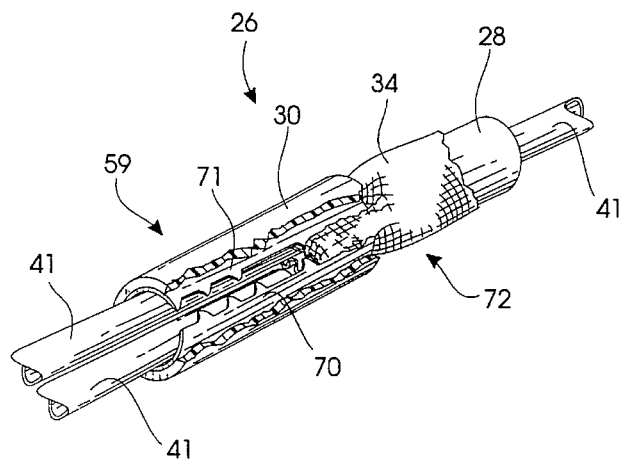

As best viewed in FIGS. 4 and 5, the ends of the coil and the body are clamped together. Clamps are used to affix the string 41 to the key 22 or clasp 16.

Cord 10 employs a clamp 59 (FIG. 5) at both ends and at its middle; cord 10A employs a clamp similar to clamp 59 adjacent portion 41B (FIG. 2) only at its lower end. At the middle of cord 10A (FIG. 2) a larger clamp 60 (FIG. 4) is preferably employed. Clamp 60 is adapted to receive and compress the relatively large diameter ends of the cord body 14. These ends have been designated by the reference numerals 65, 66 (FIG. 4). The preferably metallic clamp 60 comprises a pair of integral, parallel tubular halves 62, 63 (FIG. 4) that are compressed about body ends 65, 66 (FIG. 4). It is to be noted that coil string 41 extends into the clamp on one side, loops about the body portion, and returns through the body and the clamp, terminating in a stub 68. In this manner maximum axial strength is achieved. The crimp is covered by decorating tubular cover 30 previously mentioned.

The simpler clamp 59 (FIG. 5) includes a single, somewhat tubular portion 70 equipped with teeth 71 along opposite abutting edges. FIG. 5 illustrates how clamp 59 appears at the lower end 24 (as viewed in FIG. 1) of the cord 10. Twin portions of string 41 project from clamp 59. The end of the cord sheath 34 and the end of the core 28 are rigidly crimped together. The entire crimp is covered by tubular plastic covering 30 previously discussed.

From the foregoing, it will be seen that this invention is one well adapted to obtain all the ends and objects herein set forth, together with other advantages that are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A safety tether cord adapted to extend between a user and a watercraft ignition key for controlling and floating a watercraft ignition key, said tether cord comprising:

an elongated, flexible, looped buoyant body for floating said cord, said body adapted to be coupled to or grasped by said user and comprising:
an elongated, flexible, buoyant core of low-density, closed-cell foam;
an outer, tubular fabric sheath coaxially covering said core for strengthening and coloring said body; and,
a pair of opposing ends;
a string adapted to be coupled to said key; and,
clamp means for coupling said body to said string, said clamp means joining said string and both of said opposing ends.

2. The tether cord as defined in claim 1 wherein an end of said string forms a resilient loop, said loop coupled to said key.

3. The tether cord as defined in claim 1 wherein said string comprises an overall length and said body has an overall length that equals or exceeds said string length to force said cord to float horizontally.

4. The tether cord as defined in claim 1 wherein said tether cord comprises cover means for protectively obscuring said clamp means, said cover means coaxially fitted about said clamp means.

\* \* \* \* \*